US010157326B2

(12) United States Patent
Long et al.

(10) Patent No.: US 10,157,326 B2
(45) Date of Patent: Dec. 18, 2018

(54) METHOD AND DEVICE FOR CHARACTER AREA IDENTIFICATION

(71) Applicant: Xiaomi Inc., Beijing (CN)

(72) Inventors: Fei Long, Beijing (CN); Tao Zhang, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 134 days.

(21) Appl. No.: 15/298,270

(22) Filed: Oct. 20, 2016

(65) Prior Publication Data

US 2017/0124414 A1  May 4, 2017

(30) Foreign Application Priority Data

Oct. 30, 2015 (CN) .......................... 2015 1 0726153

(51) Int. Cl.
*G06K 9/00* (2006.01)
*G06K 9/46* (2006.01)
*G06T 5/40* (2006.01)

(52) U.S. Cl.
CPC ........... *G06K 9/46* (2013.01); *G06K 9/00463* (2013.01); *G06T 5/40* (2013.01); *G06T 2207/10004* (2013.01)

(58) Field of Classification Search
CPC .... G06K 9/46; G06T 2207/10004; G06T 5/40
See application file for complete search history.

(56) References Cited

U.S. PATENT DOCUMENTS

| 7,769,235 B2 | 8/2010 | Anisimovich et al. |
| 8,315,462 B2 | 11/2012 | Nakamura |
| 9,158,986 B2 | 10/2015 | Nakamura |
| 2004/0047508 A1 | 3/2004 | Anisimovich et al. |
| 2006/0120602 A1* | 6/2006 | Tang ...................... G06K 9/325 382/176 |
| 2010/0135578 A1* | 6/2010 | Nakamura ............... G06K 9/38 382/190 |

(Continued)

FOREIGN PATENT DOCUMENTS

| CN | 101408933 A | 4/2009 |
| CN | 102184399 A | 9/2011 |

(Continued)

OTHER PUBLICATIONS

Extended European Search Report of European Patent Application No. 16195027.4, from the European Patent Office, dated Mar. 28, 2017.

(Continued)

*Primary Examiner* — Phuoc Tran
(74) *Attorney, Agent, or Firm* — Finnegan, Henderson, Farabow, Garrett & Dunner LLP

(57) ABSTRACT

A method and a device for area identification are provided in the disclosure. The method includes: binarizing a text area including a row of characters; calculating a histogram in a vertical direction of the binarized text area, wherein the histogram includes abscissas of pixels in each column and corresponding accumulated values of foreground color pixels of the pixels in each column; and identifying a character area of each of one or more characters in the text area according to distribution information of the accumulated values.

15 Claims, 10 Drawing Sheets

(56) References Cited

U.S. PATENT DOCUMENTS

| | | |
|---|---|---|
| 2011/0255795 A1 | 10/2011 | Nakamura |
| 2012/0120457 A1 | 5/2012 | Makino et al. |
| 2013/0293776 A1 | 11/2013 | Chang et al. |
| 2015/0077817 A1 | 3/2015 | Shimazaki et al. |

FOREIGN PATENT DOCUMENTS

| | | |
|---|---|---|
| CN | 103310435 A | 9/2013 |
| CN | 104156704 A | 11/2014 |
| JP | H 11-120293 A | 4/1999 |
| JP | 2007-206985 A | 8/2007 |
| JP | 2011-227636 A | 11/2011 |
| KR | 10-1997-0049825 A | 7/1997 |
| KR | 10-2011-0087620 A | 8/2011 |
| RU | 2234126 C2 | 8/2004 |

OTHER PUBLICATIONS

Bunke H. et al., "Image Processing Methods for Document Image Analysis," dated Jan. 1, 1997, Handbook of Character Recognition and Document Image Analysis, World Scientific, Singapore [U.A.], pp. 35-38, XP-002665435, ISBN : 978-981-02-2270-3.

Office Action for Korean Application No. 10-2016-7005567, dated from the Korean Intellectual Office on Feb. 24, 2017.

International Search Report of PCT/CN2015/099299, dated from the State Intellectual Property Office of China on Jul. 21, 2016.

"Segmentation Algorithm of License Plate Characters Based on Mathematical Morphology Edge Detection," Xiong et al., dated Sep. 30, 2010.

Office Action for Russian Application No. 2016110434/08 (016435), mailed from the Russian Federal Service for Intellectual Property dated Jun. 21, 2017.

\* cited by examiner

METHOD AND DEVICE FOR CHARACTER AREA IDENTIFICATION

CROSS-REFERENCE TO RELATED APPLICATIONS

This application is based upon and claims priority to Chinese Patent Application No. 201510726153.9, filed on Oct. 30, 2015, which is incorporated herein by reference in its entirety.

FIELD

The present disclosure generally relates to the field of image processing and, more particularly, to a method and a device for character area identification.

BACKGROUND

In the field of image processing, before identifying text in an image, a terminal may need to identify a character area corresponding to each character in the text, so as to identify the character.

A conventional method for character area identification may include removing a background in an image to extract a foreground image, identifying, with an edge enhancement technology, an edge of each character in the extracted foreground image, and determining a character area of each character according to the identified edge.

In the above solution, the determined character area may be inaccurate, since the edge enhancement technology may only provide a rough location estimation.

SUMMARY

According to a first aspect of the present disclosure, there is provided a method for character area identification, comprising: binarizing a text area including a row of characters; calculating a histogram in a vertical direction of the binarized text area, wherein the histogram includes abscissas of pixels in each column and corresponding accumulated values of foreground color pixels of the pixels in each column; and identifying a character area of each of one or more characters in the text area according to distribution information of the accumulated values.

According to a second aspect of the present disclosure, there is provided a device, comprising: a processor; and a memory for storing instructions executable by the processor; wherein the processor is configured to: binarize a text area including a row of characters; calculate a histogram in a vertical direction of the binarized text area, wherein the histogram includes abscissas of pixels in each column and corresponding accumulated values of foreground color pixels of the pixels in each column; and identify a character area of each of one or more characters in the text area according to distribution information of the accumulated values.

According to a third aspect of the present disclosure, there is provided a non-transitory computer-readable storage medium storing instructions that, when executed by a processor, cause the processor to perform a method for character area identification, the method comprising: binarizing a text area including a row of characters; calculating a histogram in a vertical direction of the binarized text area, wherein the histogram includes abscissas of pixels in each column and corresponding accumulated values of foreground color pixels of the pixels in each column; and identifying a character area of each of one or more characters in the text area according to distribution information of the accumulated values.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention.

Instead, they are merely examples of devices and methods consistent with aspects related to the invention as recited in the appended claims.

In exemplary embodiments, a text area may include any characters, such as Chinese characters, English letters, English words, numerals, symbols, etc., in a same row. The characters may be characters in any language. The text area may be a part of an image of an identification (ID), a part of a scanned image of article, or a part of an electronic document; and the present disclosure is not limited thereto. Further, a top edge of the text area may be between a top edge of the characters in the same row and a bottom edge of a second row of characters above that row. A bottom edge of the text area may be between a bottom edge of the characters in the same row and a top edge of a third row of characters below that row.

Figure 1:
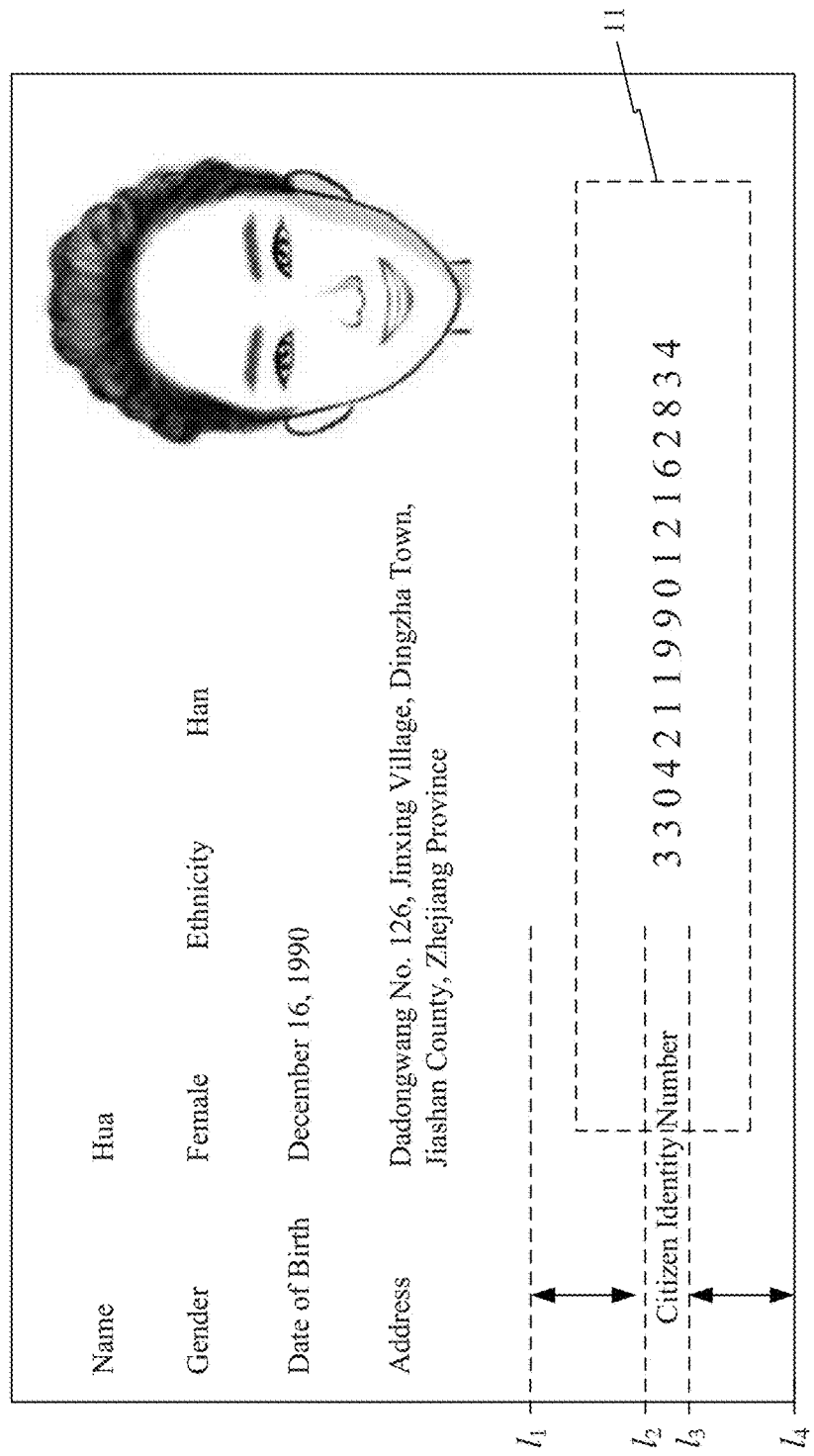
FIG. 1 is a schematic diagram illustrating a text area, according to an exemplary embodiment.

For example, as illustrated in FIG. 1, a text area may be an area 11 containing a citizen identity number in a same row on an identification card. A top edge of the text area is between $I_1$ and $I_2$, and a bottom edge of the text area is between $I_3$ and $I_4$.

In exemplary embodiments, the text area may include valid or invalid characters. A valid character may be a character that needs to be identified, and an invalid character may be a character that does not need to be identified. For example, as illustrated in FIG. 1, characters of the text area 11 may only include numbers "3 3 0 4 2 1 1 9 9 0 1 2 1 6 2 8 3 4", or may include the numbers and characters to the left of the numbers, for example, "Number 3 3 0 4 2 1 1 9 9 0 1 2 1 6 2 8 3 4." In addition, a character area may refer to an area corresponding to a single character.

In exemplary embodiments, text and characters referred to in various embodiments of the disclosure may be numerals, letters, Chinese characters, pictures, or other contents of which a number of foreground color pixels is larger than a threshold in a calculated histogram as described below.

Figure 2:
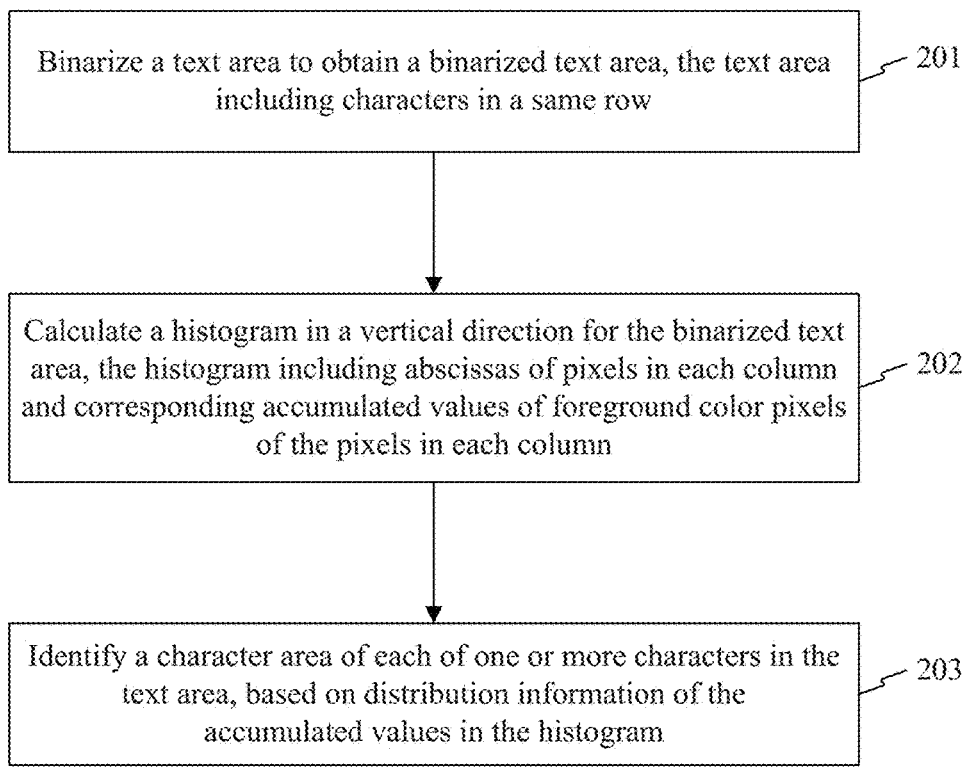
FIG. 2 is a flow chart illustrating a method for character area identification, according to an exemplary embodiment.

FIG. 2 is a flow chart illustrating a method 200 for character area identification, according to an exemplary embodiment. As shown in FIG. 2, the method 200 may include following steps.

In step 201, a text area may be binarized to obtain a binarized text area. The text area may include characters in a same row.

In step 202, a histogram may be calculated in a vertical direction for the binarized text area. The histogram may include abscissas (e.g. x-axis values) of pixels in each column and corresponding accumulated values of foreground color pixels of the pixels in each column.

In step 203, a character area of each of one or more characters in the text area may be identified, based on distribution information of the accumulated values in the histogram.

The method 200 for text area identification described above can improve an accuracy of text area identification, by calculating the histogram in the vertical direction for the binarized text area and identifying the character area of each of the characters in the text area according to the distribution information in the histogram. As a result, the character area of each of the characters may be accurately identified according to the distribution information of the accumulated values of the foreground color pixels in the histogram.

Figure 3A:
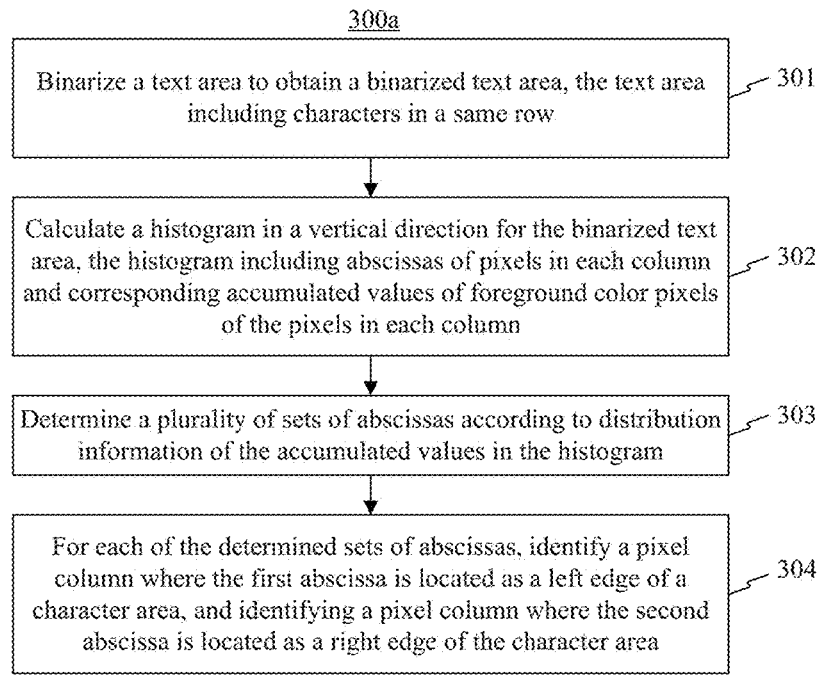
FIG. 3A is a flow chart illustrating a method for character area identification, according to an exemplary embodiment.

FIG. 3A is a flow chart illustrating a method 300a for character area identification, according to an exemplary embodiment. As shown in FIG. 3, the method 300a may include following steps.

In step 301, a text area may be binarized to obtain a binarized text area. The text area may include characters in a same row.

In some embodiments, a terminal may preprocess the text area by operations such as denoising, filtering, abstraction of an edge, and the like, and binarize the preprocessed text area.

Figure 3B:
FIG. 3B is a schematic diagram illustrating a binarized text area, according to an exemplary embodiment.

Binarization may include comparing grey scale values of pixels in the text area with a predetermined grey scale value, dividing the pixels in the text area into two groups: a first group of pixels each with a grey scale value larger than the predetermined grey scale value and a second group of pixels each with a grey scale value smaller than the predetermined grey scale value, and rendering the two groups of pixels in the text area with two different colors, such as black and white, to obtain a binarized text area, as shown in FIG. 3B. Pixels in a foreground may be called foreground color pixels, e.g., white pixels in FIG. 3B, and pixels in a background may be called background color pixels, e.g., black pixels in FIG. 3B.

In step 302, a histogram may be calculated in a vertical direction for the binarized text area. The histogram may include abscissas of pixels in each column and corresponding accumulated values of foreground color pixels of the pixels in each column.

Figure 3C:
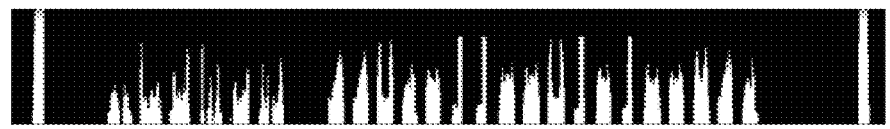
FIG. 3C is a schematic diagram illustrating a histogram calculated in a vertical direction, according to an exemplary embodiment.

The histogram may be calculated in the vertical direction after the binarization of the text area. The horizontal direction of the histogram may represent the abscissas of pixels in each column, and the vertical direction of the histogram may represent an accumulated value of a number of the foreground color pixels of the pixels in each column. The foreground color pixels may refer to pixels in a white area of the binarized text area, with respect to background color pixels. For example, the terminal may calculate the histogram. FIG. 3C is a schematic diagram illustrating a histogram calculated as described, according to an exemplary embodiment.

In step 303, a plurality of sets of abscissas may be determined according to distribution information of the accumulated values in the histogram.

Figure 3D:
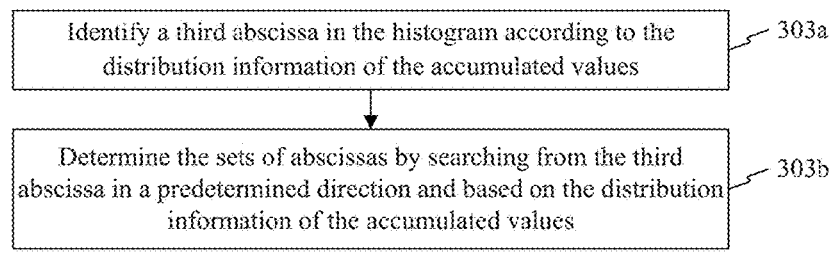
FIG. 3D is a flow chart illustrating a method for determining abscissas, according to an exemplary embodiment.

In some embodiments, referring to FIG. 3D, step 303 may include following steps.

In step 303a, a third abscissa may be identified in the histogram according to distribution information of the accumulated values.

The third abscissa may be an abscissa in the histogram corresponding to a left edge of a character area of a first valid character of a row of characters, or an abscissa in the histogram corresponding to a right edge of a character area of a last valid character of a row of characters.

Figure 3E:
FIG. 3E is a schematic diagram illustrating a third abscissa identified by a terminal in a histogram, according to an exemplary embodiment.

For example, as illustrated in FIG. 3E, an identified third abscissa may be the abscissa $X_1$ in the histogram corresponding to a left edge of the first valid character "3", or the abscissa $X_2$ corresponding to a right edge of the last valid character "4".

In step 303b, the plurality of sets of abscissas are obtained by searching from the third abscissa in a predetermined direction and based on the distribution information of the accumulated values.

After identifying the third abscissa, the terminal may search, from the third abscissa, in the predetermined direction and based on the distribution information of the accumulated value to obtain the plurality of sets of abscissas. For example, when the third abscissa corresponds to a left edge of a character area of a first valid character, the predetermined direction is towards right, and when the third abscissa corresponds to a right edge of a character area of a last valid character, the predetermined direction is towards left.

A number of the sets of the abscissas may correspond to a number of valid characters in the text area, and each set of abscissas may include a first abscissa corresponding to a left edge of a character area of a valid character and a second abscissa corresponding to the right edge of the character area. That is, each set of abscissas may include a first abscissa and a second abscissa to the right of and adjacent to the first abscissa. Accumulated values respectively corresponding to the first abscissa and an adjacent abscissa to the right of the first abscissa may be larger than a first threshold, and an accumulated value corresponding to an adjacent abscissa to the left of the first abscissa may be smaller than a second threshold. In addition, accumulated values respectively corresponding to the second abscissa and an adjacent abscissa to the left of the second abscissa may be larger than the first threshold, and an accumulated value corresponding to an adjacent abscissa to the right of the second abscissa may be smaller than the second threshold.

Figure 3F:
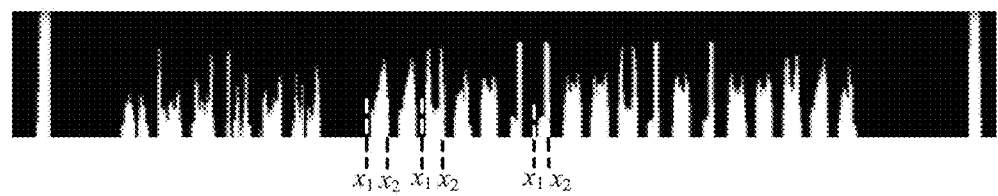
FIG. 3F is a schematic diagram illustrating each set of abscissas determined based on a histogram, according to an exemplary embodiment.

For example, the terminal may identify each of the sets of abscissas as shown in FIG. 3F with the first abscissa being $x_1$ and the second abscissa being $x_2$. FIG. 3F is only an exemplary illustration showing several identified sets of abscissas, and in practice more sets of abscissas may be included; and the present disclosure is not limited thereto.

The above first threshold and second threshold may have relatively small numerical values. For example, the first threshold and second threshold may have numerical values slightly more than 0. In some embodiments, the first threshold may be 0 and the second threshold may have a numerical value approximate to 0. Further, in some embodiments, the accumulated values respectively corresponding to the first abscissa and the next abscissa to the right side of the first abscissa may not equal to 0, the accumulated value corresponding to the next abscissa to the left of the first abscissa may equal to 0, the accumulated values respectively corresponding to the second abscissa and the next abscissa to the left of the second abscissa may not equal to 0, and the accumulated value corresponding to the next abscissa to the right of the second abscissa may equal to 0.

In step 304, for each of the determined sets of abscissas, a pixel column where the first abscissa is located may be identified as a left edge of a character area, and a pixel column where the second abscissa is located may be identified as a right edge of the character area.

The method 300 for text area identification described above can improve an accuracy of text area identification, by calculating the histogram in the vertical direction for the binarized text area and identifying the character area of each of the characters in the text area according to the distribution information in the histogram. As a result, the character area of each of the characters may be accurately identified according to the distribution information of the accumulated values of the foreground color pixels in the histogram.

In the embodiment shown in FIG. 3A, if the characters within the text area include both valid and invalid characters and a first distance between a valid character and an invalid character is larger than a second distance between two adjacent valid characters, step 303a may include following steps.

From a predetermined abscissa in the histogram and towards left, the terminal may search for and obtain a first interval having a width larger than the second distance, and determine an abscissa, to the right of the interval and having an accumulated value of foreground color pixels larger than the first threshold, to be the third abscissa.

The predetermined abscissa may be an abscissa among a predetermined range, which is a mapping range in the histogram corresponding to the valid characters in the text area. For example, as illustrated in FIG. 3E, the predetermined range is the range $[X_1, X_2]$. In some embodiments, the predetermined range may be set according to an empirical value. Further, the accumulated values of foreground color pixels in the interval may be smaller than the second threshold.

Figure 3G:
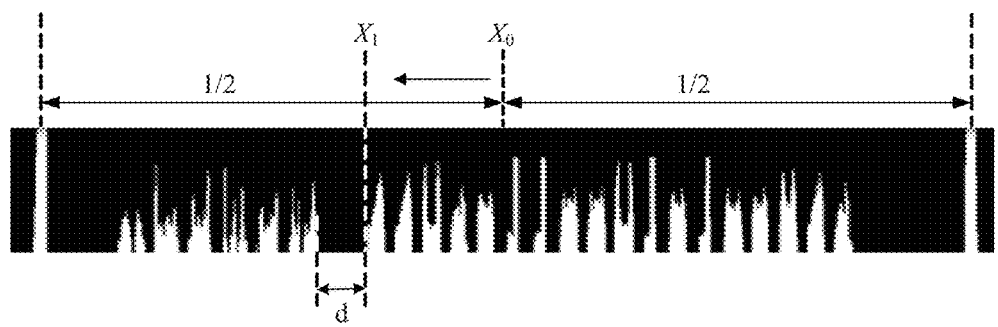
FIG. 3G is a schematic diagram illustrating predetermined abscissas in a histogram, according to an exemplary embodiment.

Taking the citizen identity card number in FIG. 1 as an example, the predetermined abscissa may correspond to a middle location in a horizontal direction of an identity card, since, by empirical knowledge of the card, the citizen identity number spans cross the middle location. For example, FIG. 3G illustrates a width of the text area being an overall width of the identity card, and the predetermined abscissa may be $X_0$. The terminal may conduct the search from $X_0$ and in the direction towards left. Since the first distance between two adjacent numerals is much smaller than the second distance between the word "number" and the first numeral "3" in the citizen identity card number, after determining an interval d larger than the second distance, the terminal may determine an abscissa $X_1$ to the right of the interval d and having an accumulated value of foreground color pixels larger than the first threshold as the third abscissa.

Similarly, the terminal may look up, starting with the predetermined abscissa and in a direction towards right, and after determining an interval larger than the second distance, determine an abscissa to the left of the interval and having an accumulated value of foreground color pixels larger than the first threshold as the third abscissa. In one embodiment with reference to FIG. 3A, if all characters in the text area are valid characters, step 303a may include following steps.

After calculating the histogram for the binarized text area, the terminal may determine an abscissa A on the left side of the histogram and having an accumulated value of foreground color pixels larger than the first threshold as an abscissas corresponding to a first valid character. The terminal then may determine the abscissa A as the third abscissa.

Figure 3H:
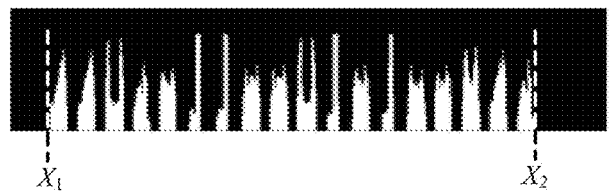
FIG. 3H is a schematic diagram illustrating a third abscissa determined based on a histogram, according to an exemplary embodiment.

For example, referring to FIG. 3H, the terminal may determine $X_1$ as the third abscissa.

Similarly, an abscissa B on the right side of the histogram and having an accumulated value of foreground color pixels larger than the first threshold may be determined as an abscissas corresponding to a last valid character. Therefore, the terminal then may determine the abscissa B as the third abscissa. Still referring to FIG. 3H, the terminal may determine $X_2$ as the third abscissa.

Figure 4:
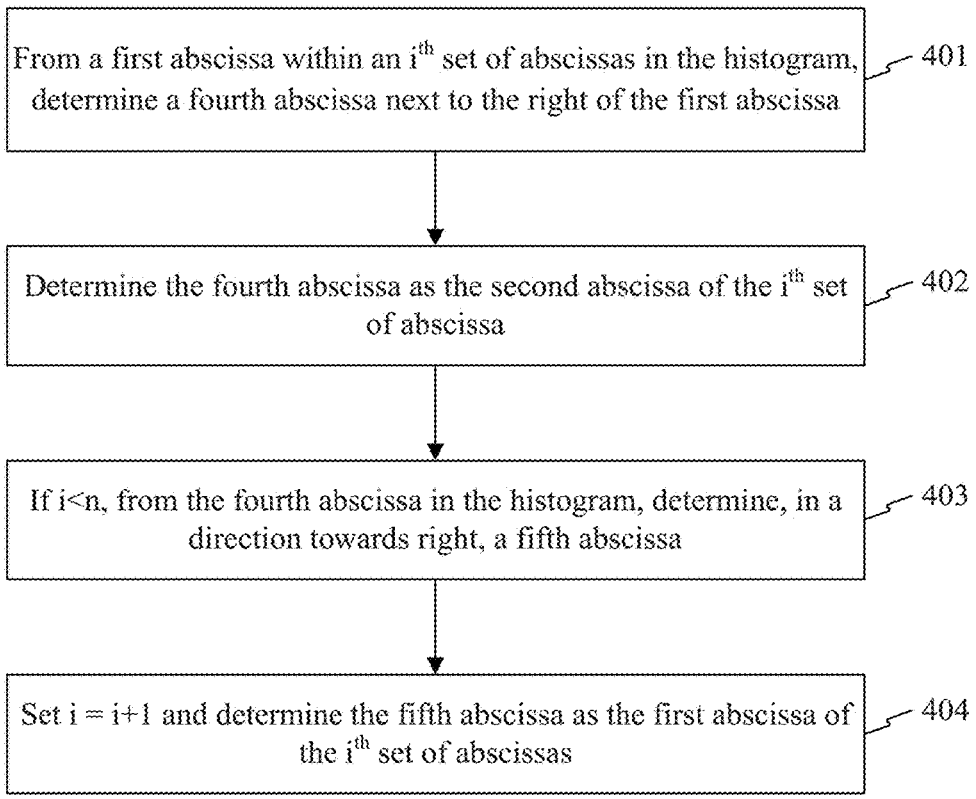
FIG. 4 is a flow chart illustrating a method for identifying each set of abscissas, according to an exemplary embodiment.

In the embodiment shown in FIG. 3A, after the terminal calculates the third abscissa as described above, if the calculated third abscissa corresponds to the left edge of the character area of a first valid character of a row of characters, step 303b may include steps 401-404 described in FIG. 4.

In step 401, for an $i^{th}$ set of abscissas and from the first abscissa within the $i^{th}$ set of abscissas in the histogram, a fourth abscissa may be searched for and obtained towards right of the first abscissa.

In some embodiments, i, larger than or equal to 1, and smaller than or equal to n, may be a positive integer with an initial value of 1, and n may be a number of valid characters. For example with reference to the citizen identity card number, the number of valid characters is 18.

Additionally, the first abscissa in the first set of abscissas may be the third abscissa. Accumulated values respectively corresponding to the fourth abscissa and an adjacent abscissa to the left side of the fourth abscissa may be larger than the first threshold, and an accumulated value corresponding to an abscissa to the right of the fourth abscissa may be smaller than the second threshold.

Taking i=1 as an example, since the first abscissa $x_1$ in the first set of abscissas may be the third abscissa $X_1$, the terminal may search from $X_1$ in the histogram and in a direction towards right, to determine and obtain a first fourth abscissa.

In step 402, the fourth abscissa may be determined as the second abscissa of the $i^{th}$ set of abscissa.

In step 403, if i is less than n, from the fourth abscissa in the histogram, a fifth abscissa may be searched for and obtained in a direction towards right.

If i is less than n, the terminal may determine that there may be at least one unidentified valid character to the right. At the point, the terminal may search, from an abscissa in the histogram corresponding to a right edge of the currently determined valid character and towards right, an abscissa corresponding to a left edge of a next valid character area.

In some embodiments, the terminal may search for and obtain, from the fourth abscissa and towards right, a first fifth abscissa. Accumulated values respectively corresponding to the fifth abscissa and an adjacent abscissa to the right of the fifth abscissa may be larger than a first threshold, and an accumulated value corresponding to an adjacent abscissa to the left of the fifth abscissa may be smaller than a second threshold.

In step 404, set i=i+1, the fifth abscissa may be determined as the first abscissa of the $i^{th}$ set of abscissas.

The terminal may determine the fifth abscissa as the abscissa in the histogram corresponding to the left edge of the next valid character area. In some embodiments, the terminal may set i=i+1, and determine the fifth abscissa as the first abscissa within the $i^{th}$ set of abscissas.

The terminal may continue to search in the direction towards right, to determine a set of abscissas corresponding to valid character areas according to the above method.

Figure 5:
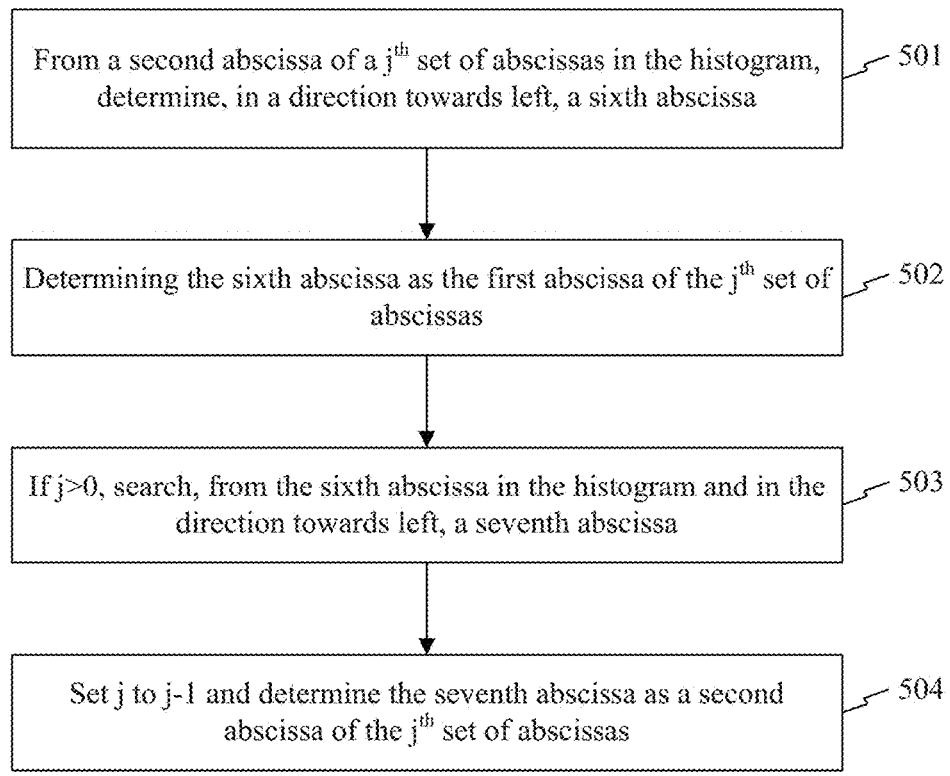
FIG. 5 is a flow chart illustrating a method for identifying each set of abscissas, according to an exemplary embodiment.

In the embodiment shown in FIG. 3A, after the terminal calculates the third abscissa as described above, if the calculated third abscissa corresponds to a right edge of a character area, step 303b may include steps 501-504 as illustrated in FIG. 5.

In step 501, for a $j^{th}$ set of abscissas, from a second abscissa of the $j^{th}$ set of abscissas in the histogram, a sixth abscissa may be searched for and obtained in a direction towards left.

Accumulated values respectively corresponding to the sixth abscissa and an adjacent abscissa to the right of the sixth abscissa may be larger than a first threshold, and an accumulated value corresponding to an adjacent abscissa to the left of the sixth abscissa may be smaller than a second threshold. j, larger than or equal to 1, and smaller than or equal to n, may be a positive integer whose initial value is n, and n may be a number of valid characters, and a second abscissa within the $n^{th}$ set of abscissas may be the third abscissa.

In step 502, the sixth abscissa may be determined as the first abscissa of the $j^{th}$ set of abscissas.

In step 503, if j>0, from the sixth abscissa in the histogram, a seventh abscissa may be searched for and obtained in the direction towards left. Accumulated values respectively corresponding to the seventh abscissa and an adjacent abscissa to the left of the seventh abscissa may be larger than a first threshold, and an accumulated value corresponding to an adjacent abscissa to the left of the seventh abscissa may be smaller than a second threshold.

In step 504, set j to j−1, the seventh abscissa may be determined as a second abscissa within the $j^{th}$ set of abscissas.

Steps 501-504 may be similar to steps 401-404. A different between them may be that the method provided in steps 401-404 includes a search from left to right, while the method provided in steps 501-504 includes a search from right to left.

Figure 6:
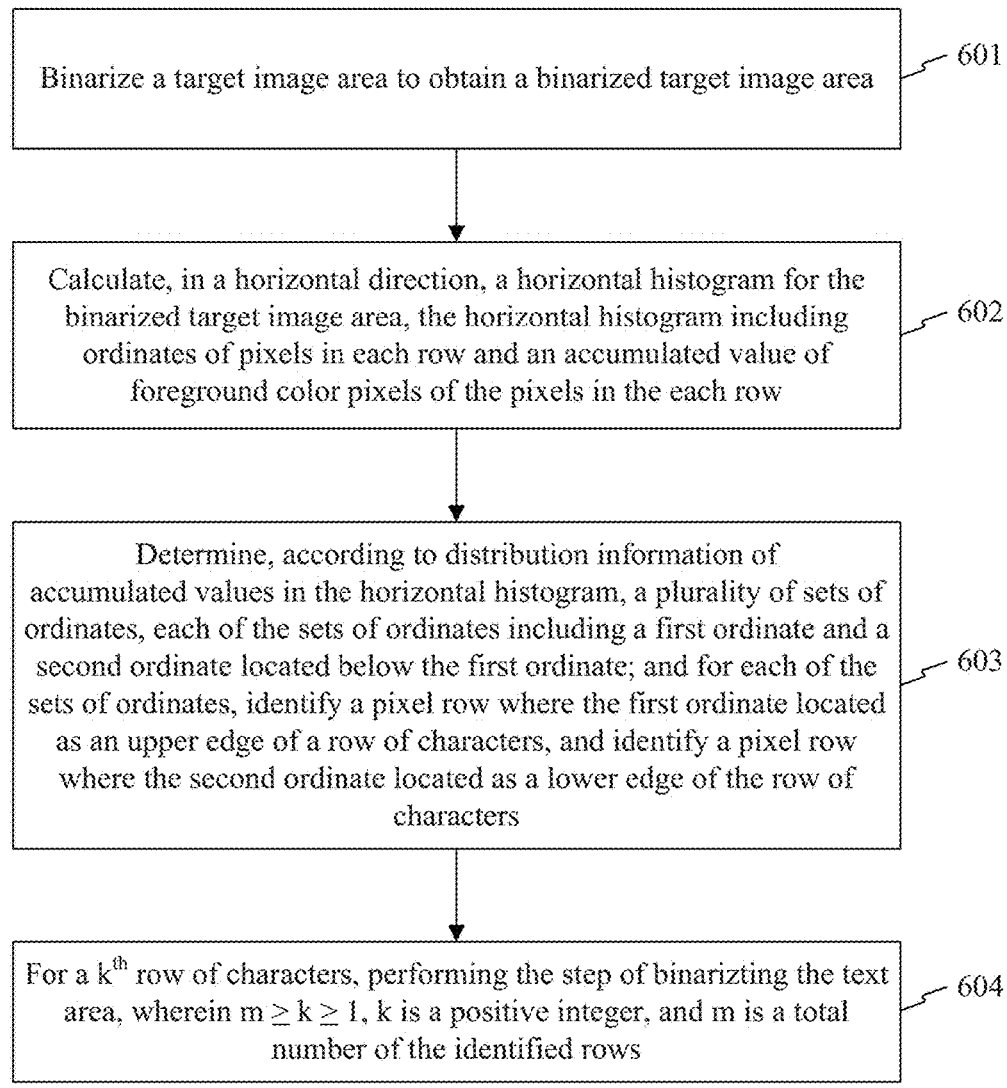
FIG. 6 is a flow chart illustrating a method for identifying a text area, according to an exemplary embodiment.

Based on the above-provided embodiments, referring to FIG. 6, before binarizing the text area to obtain the binarized text area, the terminal may further perform following steps.

In step 601, a target image area may be binarized to obtain a binarized target image area.

The target image area may include a plurality of rows of characters.

Step 601 may be similar to step 301 in the above embodiment.

In step 602, a horizontal histogram may be calculated in a horizontal direction for the binarized target image area. The horizontal histogram may include ordinates of pixels in each row and an accumulated value of foreground color pixels of the pixels in each row.

Step 602 may be similar to step 302 in the above embodiment. A difference between them may be that in step 302 the histogram may be calculated in the vertical direction for the binarized text area, while in step 602 the histogram may be calculated in the horizontal direction for a binarized target image area.

In step 603, a plurality of sets of ordinates may be determined according to distribution information of accumulated values in the horizontal histogram, and each set of ordinates may include a first ordinate and a second ordinate located below the first ordinate. For each set of ordinates, a pixel row where the first ordinate located may be determined as an upper edge of a corresponding row of characters, and a pixel row where the second ordinate located may be determined as a lower edge of the corresponding row of characters.

After calculating the horizontal histogram, the terminal may determine the sets of ordinates according to the distribution information of accumulated values in the histogram, and then identify an area for the each row according to each of the sets of ordinates.

The step may be similar to the embodiments described above, e.g., steps of determining the sets of abscissas according to the distribution information of accumulated values in the vertical histogram, and then determining the left edge and the right edge of each character according to each of the sets of abscissas. Details may be referred to the above embodiments.

Accumulated values respectively corresponding to the first ordinate and an adjacent ordinate below the first ordinate may be larger than a first threshold, and an accumulated value corresponding to an adjacent ordinate above the first ordinate may be smaller than a second threshold, and accumulated values respectively corresponding to the second ordinate and an adjacent ordinate above the second ordinate may be larger than the first threshold, and an accumulated value corresponding to an adjacent ordinate below the second ordinate may be smaller than the second threshold.

In step 604, the step of binarizing the text area to obtain the binarized text area may be performed for a $k^{th}$ row of characters, k is a positive integer larger than or equal to 1, and smaller than or equal to m, and m may be a total number of the identified rows.

After identifying all rows of characters in step 603, the terminal may perform the step of binarizing the text area to obtain the binarized text area for each of the rows.

As such, the terminal may identify the character areas of valid characters in each row in the target image area.

In some embodiments, the terminal may determine the text area according to the horizontal histogram. In some other embodiments, the terminal may determine the text area by other methods. For example, the terminal may obtain the text area by an image positioning technology. Taking the citizen identity card as an example, since the citizen identity card number may be located at a relatively fixed position and relatively far from an address and a picture, the terminal may directly locate the bottom ⅕ area of the card image as the text area.

Figure 7:
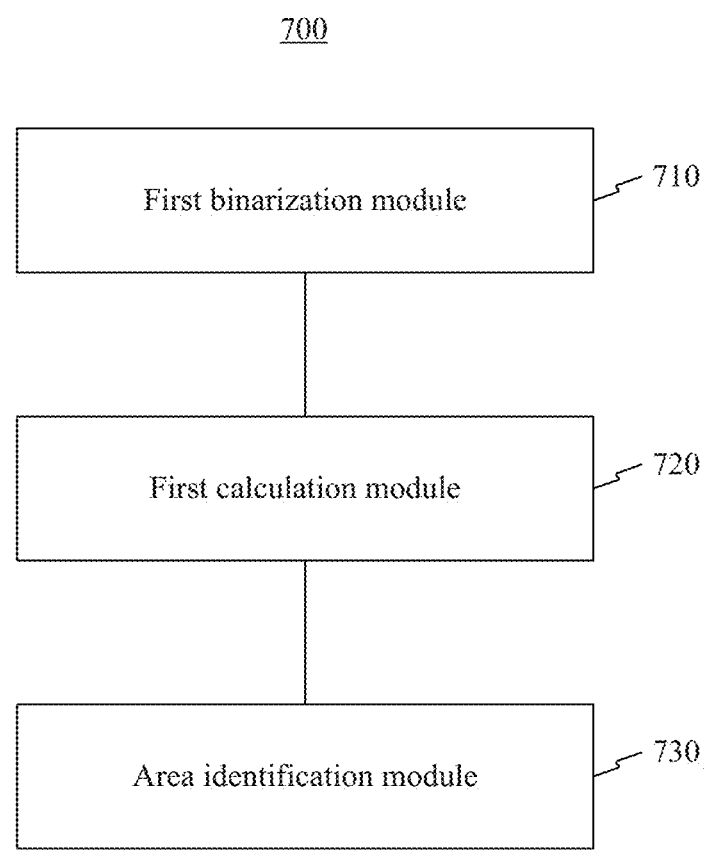
FIG. 7 is a block diagram illustrating a device for character area identification, according to an exemplary embodiment.

FIG. 7 is a block diagram illustrating a device 700 for character area identification, according to an exemplary embodiment. As shown in FIG. 7, the device 700 may include a first binarization module 710, a first calculation module 720, and an area identification module 730.

The first binarization module 710 may be configured to binarize a text area to obtain a binarized text area. The text area may include a plurality of characters in a same row.

The first calculation module 720 may be configured to calculate a histogram in a vertical direction for the binarized text area. The histogram may include abscissas of pixels in each column and an accumulated value of foreground color pixels of the pixels in the each column.

The area identification module 730 may be configured to identify a character area of each of one or more characters in the text area, based on distribution information of the accumulated value in the histogram.

The method for text area identification described above can improve an accuracy of text area identification, by calculating the histogram in the vertical direction for the binarized text area and identifying the character area of each of the characters in the text area according to the distribution information in the histogram. As a result, the character area of each of the characters may be accurately identified according to the distribution information of the accumulated value of the foreground color pixels in the histogram.

Figure 8:
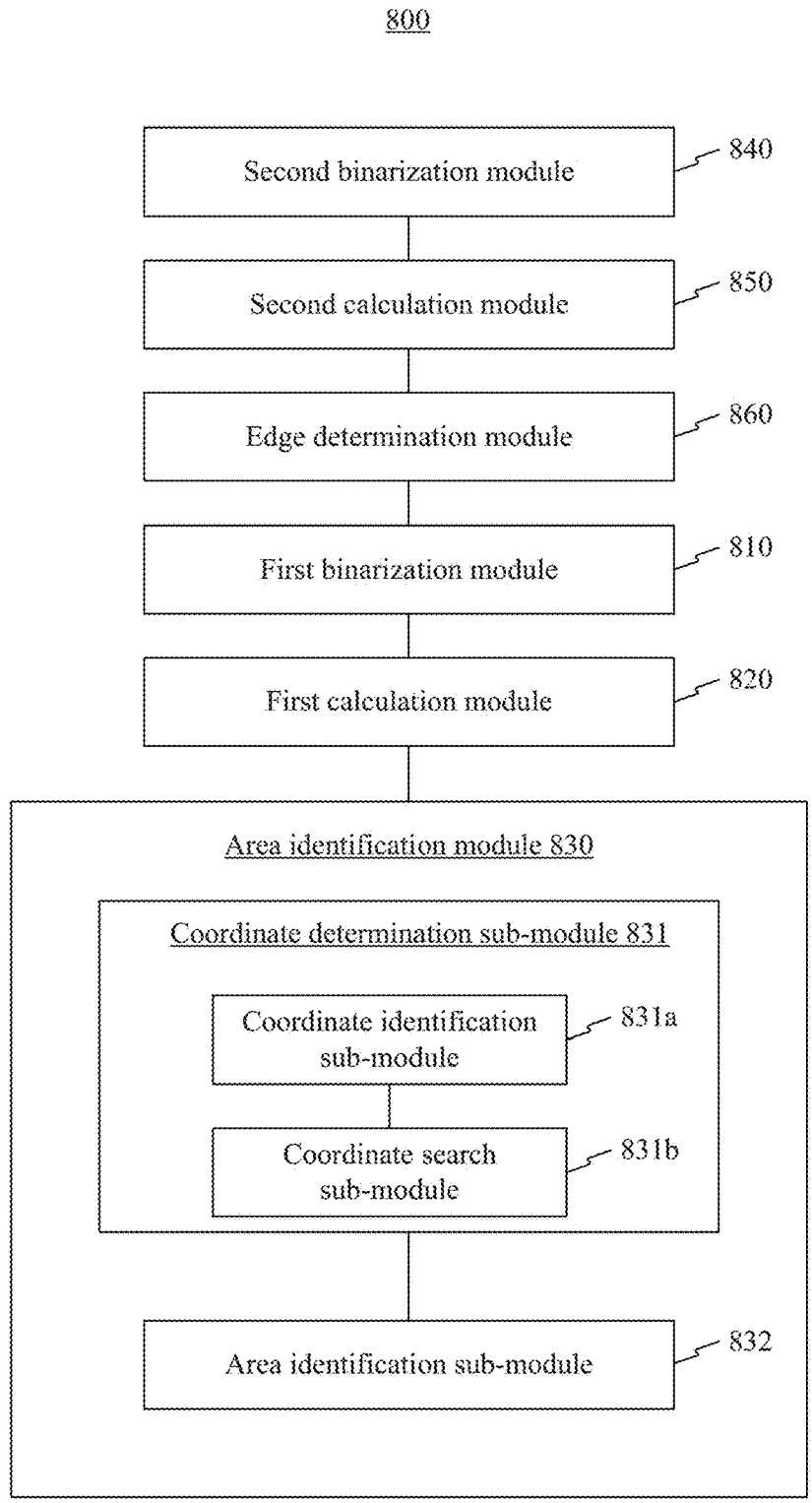
FIG. 8 is a block diagram illustrating a device for character area identification, according to an exemplary embodiment.

FIG. 8 is a block diagram illustrating a device 800 for character area identification, according to an exemplary embodiment. As shown in FIG. 8, the device 800 may include a first binarization module 810, a first calculation module 820, and an area identification module 830.

The first binarization module 810 may be configured to binarize a text area to obtain a binarized text area. The text area may include a plurality of characters in a same row.

In some embodiments, the first binarization module 810 may preprocess the text area by, for example, denoising, filtering, abstraction of an edge, and the like, and binarize the preprocessed text area.

Binarization may include comparing grey scale values of pixels in the text area with a predetermined grey scale value, dividing the pixels in the text area into two groups: a first group of pixels each with a grey scale value larger than the predetermined grey scale value and a second group of pixels each with a grey scale value smaller than the predetermined grey scale value, and rendering the two groups of pixels in the text area with two different colors, such as black and white, to obtain a binarized text area.

The first calculation module 820 may be configured to calculate a histogram in a vertical direction for the binarized text area. The histogram may include abscissas of pixels in each column and an accumulated value of foreground color pixels of the pixels in the each column.

After the first binarization module 810 binarizes the text area, the first calculation module 820 may calculate the histogram in the vertical direction. The horizontal direction of the histogram may represent the abscissas of the pixels in the each column, and the vertical direction of the histogram may represent an accumulated value of a number of the foreground color pixels of the pixels in the each column, The foreground color pixels may refer to pixels in a white area of the binarized text area, with respect to background color pixels.

The area identification module 830 may be configured to identify a character area of each of one or more characters in the text area, according to distribution information of accumulated values in the histogram.

In an embodiment, the area identification module 830 may include a coordinate determination sub-module 831 and an area identification sub-module 832.

The coordinate determination sub-module 831 may be configured to determine a plurality of sets of abscissas, according to the distribution information of accumulated values in the histogram. Each set of abscissas may include a first abscissa and a second abscissa to the right of and closest to the first abscissa. Accumulated values respectively corresponding to the first abscissa and an adjacent abscissa to the right of the first abscissa may be larger than a first threshold, and a next accumulated value corresponding to an adjacent abscissa to the left of the first abscissa may be smaller than a second threshold. In addition, accumulated values respectively corresponding to the second abscissa and an adjacent abscissa to the left of the second abscissa may be larger than the first threshold, and a next accumulated value corresponding to an adjacent abscissa to the right of the second abscissa may be smaller than the second threshold.

The area identification sub-module 832 may be configured to, for each set of abscissas, determine a pixel column where the first abscissa is located as a left edge of a character area and a pixel column where the second abscissa is located as a right edge of the character area.

Additionally, the coordinate determination sub-module 831 may include a coordinate identification sub-module 831a and a coordinate search sub-module 831b.

The coordinate identification sub-module 831a may be configured to identify a third abscissa in the histogram according to the distribution information of accumulated values. The third abscissa may be an abscissa in the histogram corresponding to a left edge of a character area of a first valid character among a row of characters, or an abscissa in the histogram corresponding to a right edge of a character area of a last valid character among the row of characters.

The coordinate search sub-module 831b may be configured to search for and obtain, from the third abscissa, in a predetermined direction and based on the distribution information of accumulated values, a plurality of sets of abscissas.

After the coordinate identification sub-module 831a identifies the third abscissa, the coordinate search sub-module 831b may search for and obtain, from the third abscissa, in the predetermined direction, and based on the distribution information of accumulated values, the sets of abscissas. If the third abscissa corresponds to the left edge of the character area of the first valid character, the predetermined direction is towards right, and if the third abscissa corresponds to the right edge of the character area of the last valid character, the predetermined direction is towards left.

A number of sets of the abscissas may correspond to the number of valid characters in the text area, e.g., each set of abscissas may include a first abscissa corresponding to a left edge of a character area of a valid character and a second abscissa corresponding to a right edge of the character area. That is, the each set of abscissas may include the first abscissa and the second abscissa located next right to the first abscissa. Accumulated values respectively corresponding to the first abscissa and an adjacent abscissa to the right of the first abscissa may be larger than a first threshold, and an accumulated value corresponding to an adjacent abscissa to the left of the first abscissa may be smaller than a second threshold. Accumulated values respectively corresponding to the second abscissa and an adjacent abscissa to the left of the second abscissa may be larger than the first threshold, and an accumulated value corresponding to an adjacent abscissa to the right of the second abscissa may be smaller than the second threshold.

The first threshold and second threshold may have relatively small numerical values. For example, the first threshold and second threshold may have numerical values slightly more than 0. In some embodiments, the first threshold may be 0 and the second threshold may have a numerical value approximate to 0. Further, the accumulated values respectively corresponding to the first abscissa and the next abscissa to the right of the first abscissa may not equal to 0, and the accumulated value corresponding to the next abscissa to the left side of the first abscissa may equal to 0. The accumulated values respectively corresponding to the second abscissa and the next abscissa to the left of the second abscissa may not equal to 0, and the accumulated value corresponding to the abscissa to the right of the second abscissa may equal to 0.

In some embodiments, the third abscissa may correspond to the left edge of the character area of the first character of the row of characters.

The coordinate search sub-module 831b may be further configured to search for and obtain, from the first abscissa within an $i^{th}$ set of abscissas in the histogram and towards right, a fourth abscissa. Accumulated values respectively corresponding to the fourth abscissa and an adjacent abscissa to the left of the fourth abscissa may be larger than a first threshold, and an accumulated value corresponding to an abscissa to the right of the fourth abscissa may be smaller than a second threshold. i, larger than or equal to 1, and smaller than or equal to n, may be a positive integer whose initial value is 1, and n may be a number of valid characters in the row of characters, and the first abscissa within the first set of abscissas may be the third abscissa.

The coordinate search sub-module 831b may be further configured to determine the fourth abscissa to be the second abscissa within the $i^{th}$ set of abscissas.

The coordinate search sub-module 831b may be further configured to search for and obtain, from the fourth abscissa in the histogram and towards right, a fifth abscissa, if i is less than n. Accumulated values respectively corresponding to the fifth abscissa and an adjacent abscissa to the right of the fifth abscissa may be larger than a first threshold, and an accumulated value corresponding to an adjacent abscissa to the left of the fifth abscissa may be smaller than a second threshold.

The coordinate search sub-module 831b may be further configured to set i=i+1 and determine the fifth abscissa to be the first abscissa of the $i^{th}$ set of abscissas.

The coordinate search sub-module 831b may determine the obtained abscissa to be the abscissa in the histogram corresponding to the left edge of the character area of the next valid character. In some embodiments, the coordinate search sub-module 831b may set i=i+1, and determine the fifth abscissa to be the first abscissa of the $i^{th}$ set of abscissas.

The coordinate search sub-module 831b may continue searching towards right to determine a set of abscissas corresponding to the character area of each of the valid characters according to the above method.

In some embodiments, the third abscissa may correspond to a right edge of the character area of the last valid character among the row of characters.

The coordinate search sub-module 831b may be further configured to perform the following operations: searching for and obtaining, from a second abscissa within a $j^{th}$ set of abscissas in the histogram and towards left, a sixth abscissa, and determining the sixth abscissa as the first abscissa within the $j^{th}$ set of abscissas. Accumulated values respectively corresponding to the sixth abscissa and an adjacent abscissa to the right of the sixth abscissa may be larger than a first threshold, and an accumulated value corresponding to an adjacent abscissa to the left of the sixth abscissa may be smaller than a second threshold. j, larger than or equal to 1, and smaller than or equal to n, may be a positive integer whose initial value is n, and n is a number of valid characters in a row of characters. The second abscissa within the $n^{th}$ set of abscissas may be the third abscissa.

The coordinate search sub-module 831b may be further configured to search for and obtain, from the sixth abscissa in the histogram and towards left, a seventh abscissa, if j is more than 0. Accumulated values respectively corresponding to the seventh abscissa and an adjacent abscissa to the left of the seventh abscissa may be larger than a first threshold, and an accumulated value corresponding to an adjacent abscissa to the left of the seventh abscissa may be smaller than a second threshold, and j, larger than or equal to 1, and smaller or equal to n, may be a positive integer whose initial value is n.

The coordinate search sub-module 831b may be further configured to set j to j−1 and determine the seventh abscissa as the second abscissa within the $j^{th}$ set of abscissas.

In some embodiments, the third abscissa may correspond to a left edge of the character area of the first valid character among a row of characters.

If the third abscissa corresponds to a right edge of the character area of the last valid character among the row of characters, the coordinate search sub-module 831b may perform similar steps as those described above with respect to the third abscissa corresponding to a left edge of the character area of the first valid character.

If the characters include both valid and invalid characters and a first distance between a valid and an invalid character is larger than a second distance between two adjacent valid characters, the coordinate identification sub-module 831a may be configured to search for and obtain, from a predetermined abscissa in the histogram and towards left, a first interval of which a width is larger than the second distance, and determine an abscissa to the right of the interval and having an accumulated value of foreground color pixels larger than the first threshold to be the third abscissa. The predetermined abscissa may belong to a predetermined range set according to an empirical value, and an accumulated value of foreground color pixels in the interval may be smaller than a second threshold.

In some embodiments, if all characters in the text area are valid characters, the coordinate identification sub-module 831a may be configured to determine a first one of abscissas on a left side of the histogram and having an accumulated value of foreground color pixels larger than the first threshold as the third abscissas.

In some embodiments, if the characters include both valid and invalid characters, and if the first distance between a valid character and an invalid character is larger than a second distance between two adjacent valid characters, the coordinate identification sub-module 831a may be configured to search for and obtain, from a predetermined abscissa in the histogram and towards left, a first interval of which a width is larger than the second distance, and determine an abscissa to the right of the interval and having an accumulated value of foreground color pixels larger than the first threshold as the third abscissa.

The predetermined abscissa may be in a predetermined range, which is a mapping range in the histogram corresponding to the valid characters in the text area.

Similarly, the coordinate identification sub-module 831a may search for and determine, from the predetermined abscissa and towards right, and after obtaining an interval larger than the second distance, an abscissa located on the left side of the interval and having an accumulated value of foreground color pixels larger than the first threshold as the third abscissa.

In some embodiments, if the characters are all valid characters, and after calculating the histogram for the binarized text area, the coordinate identification sub-module 831a may determine a first one of abscissas on a left side of the histogram and having an accumulated value of foreground color pixels larger than the first threshold to correspond to the first valid character and to be the third abscissa.

In some embodiments, the third abscissa may correspond to a right edge of a character area of a last valid character among a row of characters.

If the characters include both valid and invalid characters and a first distance between a valid and an invalid character is larger than a second distance between two adjacent valid characters, the coordinate identification sub-module 831a may be configured to search for and obtain, from a predetermined abscissa in the histogram and towards right, an interval of which a width is larger than the second distance, and determine an abscissa located on the left side of the interval and having an accumulated value of foreground color pixels larger than the first threshold to be the third abscissa. The predetermined abscissa may belong to a predetermined range set according to an empirical value, and an accumulated value of foreground color pixels in the interval may be smaller than a second threshold.

In some embodiments, if the characters are all valid characters, the coordinate identification sub-module 831a may be configured to determine a first one of abscissas on the right side of the histogram, of which the accumulated value of foreground color pixels is larger than the first threshold, as the third abscissas.

If the third abscissa corresponds to a right edge of the character area of the last valid character among a row of characters, the coordinate identification sub-module 831a may perform similar steps described above with reference to the third abscissa corresponding to the left edge of the character area of the first valid character.

In some embodiments, the device 800 may further include a second binarization module 840, a second calculation module 850, and an edge determination module 860.

The second binarization module 840 may be configured to binarize a target image area to obtain a binarized target image area.

The target image area may be an area including a plurality of rows of characters.

The second binarization module 840 may be similar to the first binarization module 810.

The second calculation module 850 may be configured to calculate a horizontal histogram in a horizontal direction for a binarized target image area. The horizontal histogram may include ordinates of pixels in each row and an accumulated value of foreground color pixels of the pixels in the each row.

The second calculation module 850 may be similar to the first calculation module 820, and a difference between them may be that the first calculation module 820 may calculate the histogram in the vertical direction for the binarized text area, while the second calculation module 850 may calculate the histogram in the horizontal direction for a binarized target image area.

The edge determination module 860 may be configured to determine a plurality of sets of ordinates, according to distribution information of accumulated values in the histogram, and each set of ordinates may include a first ordinate and a second ordinate located below the first ordinate. For each set of ordinates, the row of pixels where the first ordinate locates may be determined as an upper edge of a row of characters, and the row of pixels where the second ordinate locates may be determined as a lower edge of a row of characters. Accumulated values respectively corresponding to the first ordinate and an adjacent next ordinate below the first ordinate may be larger than a first threshold, and an accumulated value corresponding to an adjacent ordinate above the first ordinate may be smaller than a second threshold, and accumulated values respectively corresponding to the second ordinate and an adjacent ordinate above the second ordinate may be larger than the first threshold, and an accumulated value corresponding to an adjacent ordinate below the second ordinate may be smaller than the second threshold.

After calculating the horizontal histogram in the horizontal direction, the edge determination module 860 may determine the sets of ordinates according to the distribution information of accumulated values in the histogram, and identify an area for each row according to each of the sets of ordinates.

The first binarization module 810 may be further configured to binarize a $k^{th}$ row of characters to obtain a binarized text area, k is a positive integer larger than or equal to 1, and smaller than or equal to m, and m is a total number of the identified rows.

As such, the device 800 may identify a character area of each valid character in each row of the target image area.

The method for text area identification described above can improve an accuracy of text area identification, by calculating the histogram in the vertical direction for the binarized text area and identifying the character area of each of the characters in the text area according to the distribution information in the histogram. As a result, the character area of each of the characters may be accurately identified according to the distribution information of the accumulated values of the foreground color pixels in the histogram.

Figure 9:
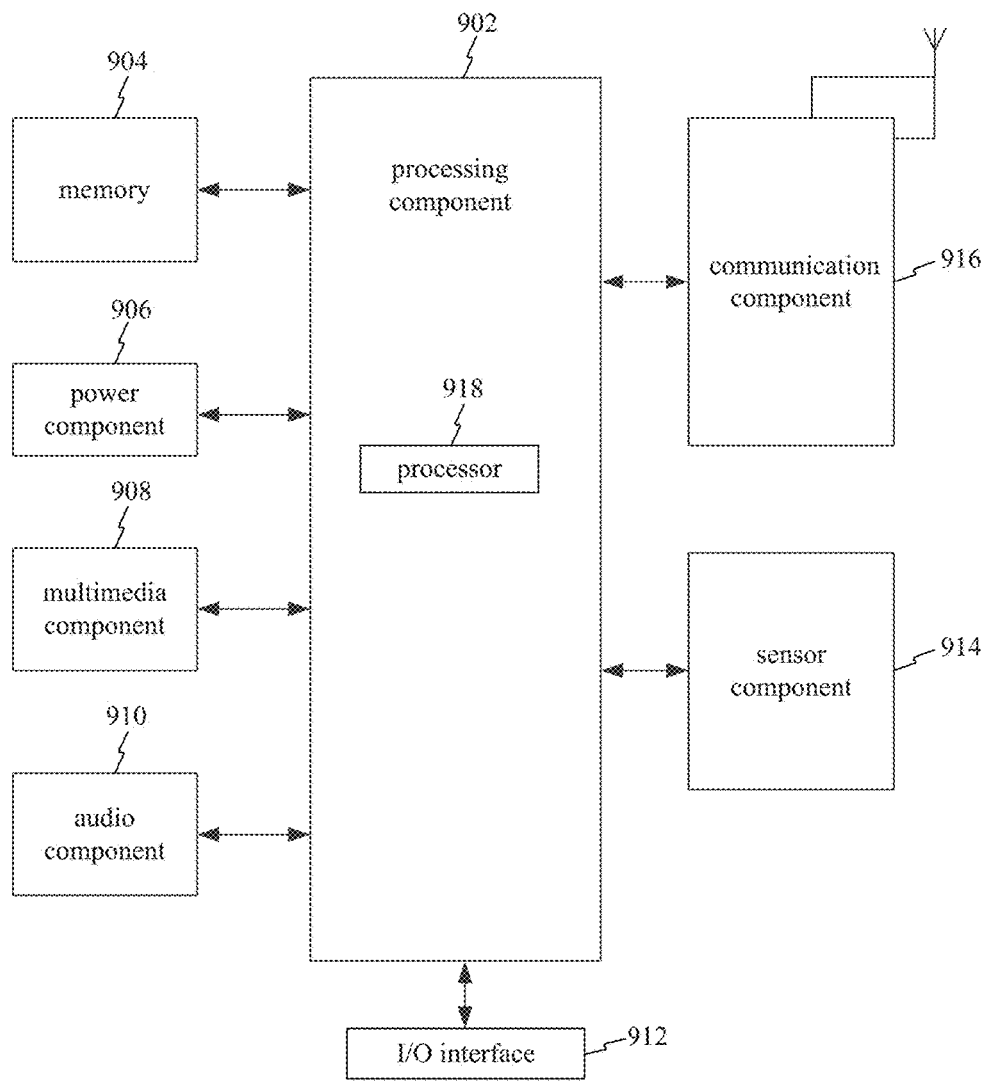
FIG. 9 is a block diagram illustrating a device for character area identification, according to an exemplary embodiment.

FIG. 9 is a block diagram illustrating a device 900 for character area identification, according to an exemplary embodiment. For example, the device 900 may be a mobile phone, a computer, a digital broadcast terminal, a messaging device, a gaming console, a tablet, a medical device, exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 may control overall operations of the device 900, such as the operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 may be configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 904 may be non-transitory and computer-readable.

The power component 906 may provide power to various components of the device 900. The power component 906 may include a power management system, one or more power sources, and any other components associated with the generation, management, and distribution of power for the device 900.

The multimedia component 908 may include a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 may include a front camera and/or a rear camera. The front camera and the rear camera may receive an external multimedia datum, while the device 900 is in an operation mode, such as a photographing mode or a video mode. Each of the front camera and the rear camera may be a fixed optical lens system or have optical focusing and zooming capability.

The audio component 910 may be configured to output and/or input audio signals. For example, the audio component 910 includes a microphone ("MIC") configured to receive an external audio signal, when the device 900 is in an operation mode, such as a call mode, a recording mode, and a voice recognition mode. The received audio signal may be further stored in the memory 904 or transmitted via the communication component 916. In some embodiments, the audio component 910 may further include a speaker to output audio signals.

The I/O interface 912 may provide an interface between the processing component 902 and peripheral interface modules, the peripheral interface modules being, for example, a keyboard, a click wheel, buttons, and the like. The buttons may include a home button, a volume button, a starting button, and a locking button.

The sensor component 914 may include one or more sensors to provide status assessments of various aspects of the device 900. For instance, the sensor component 914 may detect an open/closed status of the device 900, relative positioning of components (e.g., the display and the keypad, of the device 900), a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of a nearby object without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 may be configured to facilitate communication, wired or wirelessly, between the device 900 and other devices. The device 900 can access a wireless network based on a communication standard, such as WiFi, 2G, or 3G, or a combination thereof. In an exemplary embodiment, the communication component 916 may receive a broadcast signal or broadcast associated information from an external broadcast management system via a broadcast channel In an exemplary embodiment, the communication component 916 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 918 in the device 900, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the disclosure. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It will be appreciated that the disclosure is not limited to the exact structure as described above and shown in the figures, but can have various modification and alternations without departing from the scope of the disclosure. The scope of the disclosure is limited only by the appended claims.

What is claimed is:

1. A method for character area identification, comprising:
binarizing a text area including a row of characters;
calculating a histogram in a vertical direction of the binarized text area, wherein the histogram includes abscissas of pixels in each column and corresponding accumulated values of foreground color pixels of the pixels in each column; and
identifying a character area of each of one or more characters in the text area according to distribution information of the accumulated values,
wherein identifying the character area of each of the one or more characters comprises:
 determining a plurality of sets of abscissas according to the distribution information of the accumulated values in the histogram, each of the plurality of sets of abscissas including a first abscissa and a second abscissa to the right of the first abscissa, wherein:
  accumulated values respectively corresponding to the first abscissa and an adjacent abscissa on the right of the first abscissa are larger than a first threshold,
  an accumulated value corresponding to an adjacent abscissa on the left of the first abscissa is smaller than a second threshold,
  accumulated values respectively corresponding to the second abscissa and an adjacent abscissa on the left of the second abscissa are larger than the first threshold, and
  an accumulated value corresponding to an adjacent abscissa on the right of and the second abscissa is smaller than the second threshold; and
 for each of the plurality of sets of abscissas, identifying a pixel column where the first abscissa locates as a left edge of a character area, and identifying a pixel column where the second abscissa locates as a right edge of the character area.

2. The method of claim 1, wherein determining the plurality of sets of abscissas according to the distribution information of the accumulated values in the histogram comprises:
identifying a third abscissa in the histogram according to the distribution information of the accumulated values, wherein the third abscissa corresponds to a left edge of a character area of a first valid character among the row of characters, or corresponds to a right edge of a character area of a last valid character among the row of characters; and
searching for and obtaining, from the third abscissa in a predetermined direction and based on the distribution information of the accumulated values, the plurality of sets of abscissas.

3. The method of claim 2, wherein:
the third abscissa corresponds to the left edge of the character area of the first valid character among the row of characters; and
searching for and obtaining, from the third abscissa in the predetermined direction and based on the distribution information of the accumulated values, the plurality of abscissas comprises:
 searching for and obtaining, from a first abscissa of an $i^{th}$ set of abscissas in the histogram and towards right, a fourth abscissa, wherein:
  accumulated values respectively corresponding to the fourth abscissa and an adjacent abscissa to the left of the fourth abscissa are larger than the first threshold,
  an accumulated value corresponding to an adjacent abscissa to the right of the fourth abscissa is smaller than the second threshold,
  i is larger than or equal to 1, and smaller than or equal to n,
  i is a positive integer of which an initial value is 1,
  n is a number of valid characters in the row of character, and
  the first abscissa of the $i^{th}$ set of abscissas is the third abscissa;
 determining the fourth abscissa to be a second abscissa of the $i^{th}$ set of abscissas;
 searching for and obtaining, from the fourth abscissa in the histogram and towards right, a fifth abscissa, if i is less than n, wherein:
  accumulated values respectively corresponding to the fifth abscissa and an adjacent abscissa to the right of the fifth abscissa are larger than the first threshold, and
  an accumulated value corresponding to an adjacent abscissa on the left of the fifth abscissa is smaller than the second threshold; and
 setting i to i+1, and determining the fifth abscissa to be the first abscissa of the $i^{th}$ set of abscissas.

4. The method of claim 2, wherein:
the third abscissa corresponds to the right edge of the character area of the last valid character among the row of characters; and
searching for and obtaining, from the third abscissa in the predetermined direction and based on the distribution information of accumulated values, the plurality of sets of abscissas comprises:
 searching for and obtaining, from a second abscissa of a $j^{th}$ set of abscissas in the histogram and towards left, a sixth abscissa, wherein:
  accumulated values respectively corresponding to the sixth abscissa and an adjacent abscissa to the right of the sixth abscissa are larger than the first threshold,
  an accumulated value corresponding to an adjacent abscissa to the left of the sixth abscissa is smaller than the second threshold,
  j is larger than or equal to 1, and smaller than or equal to n,
  j is a positive integer of which an initial value is n,
  n is a number of valid characters in the row of characters, and
  the second abscissa of the $j^{th}$ set of abscissas is the third abscissa;
 determining the sixth abscissa to be the first abscissa of the $j^{th}$ set of abscissas;
 searching for and obtaining, from the sixth abscissa in the histogram and towards left, a seventh abscissa, if j is greater than 0, wherein:
  accumulated values respectively corresponding to the seventh abscissa and an adjacent abscissa to the left of the seventh abscissa are larger than the first threshold, and
  an accumulated value corresponding to an adjacent abscissa to the right side of the seventh abscissa is smaller than the second threshold; and
 setting j to j−1, and determining the seventh abscissa to be the second abscissa of the $j^{th}$ set of abscissas.

5. The method of claim 2, wherein:
the third abscissa corresponds to the left edge of the character area of the first valid character among the row of characters; and
identifying the third abscissa in the histogram according to the distribution information of the accumulated values comprises:
when the row of characters include both valid and invalid characters and a first distance between a valid character and an invalid character is larger than a second distance between two adjacent valid characters, searching for and obtaining, from a predetermined abscissa in the histogram and towards left, an interval having a width is larger than the second distance, and determining, an abscissa located on a right side of the interval and having an accumulated value of foreground color pixels larger than the first threshold, as the third abscissa, wherein:
the predetermined abscissa is among a predetermined range set according to an empirical value, and
the accumulated value of the foreground color pixels in the interval is smaller than the second threshold; and
when the row of characters are all valid characters, determining a first one of abscissas, located on the left side of the histogram and having an accumulated value of foreground color pixels larger than the first threshold, as the third abscissa.

6. The method of claim 2, wherein:
the third abscissa corresponds to a right edge of the character area of the last valid character among the row of characters; and
identifying the third abscissa in the histogram according to the distribution information of the accumulated values comprises:
when the row of characters include both valid and invalid characters and a first distance between a valid character and an invalid character is larger than a second distance between two adjacent valid characters, searching for and obtaining, from a predetermined abscissa in the histogram and towards right, an interval having a width larger than the second distance, and determining, an abscissa located on a left side of the interval and having an accumulated value of foreground color pixels larger than the first threshold, as the third abscissa, wherein:
the predetermined abscissa is among a predetermined range set according to an empirical value, and
the accumulated value of the foreground color pixels in the interval is smaller than the second threshold; and
when the row of characters are all valid characters, determining a first one of abscissas, located on the right side of the histogram and having an accumulated value of foreground color pixels larger than the first threshold, as the third abscissa.

7. The method of claim 1, before binarizing the text area including the row of characters, further comprising:
binarizing a target image area;
calculating, in a horizontal direction, a horizontal histogram for the binarized target image area, wherein the horizontal histogram includes ordinates of pixels in each row and corresponding accumulated values of foreground color pixels of the pixels in each row;
determining, according to distribution information of the accumulated values in the horizontal histogram, a plurality of sets of ordinates, each of the plurality of sets of ordinates including a first ordinate and a second ordinate below the first ordinate; and
for each of the plurality of sets of ordinates, identifying a pixel row where the first ordinate is located as an upper edge of a corresponding row of characters, and identifying a pixel row where the second ordinate is located as a lower edge of the corresponding row of characters, wherein:
accumulated values respectively corresponding to the first ordinate and an adjacent ordinate below the first ordinate are larger than the first threshold,
an accumulated value corresponding to an adjacent ordinate above the first ordinate is smaller than the second threshold,
accumulated values respectively corresponding to the second ordinate and an adjacent ordinate above the second ordinate are larger than the first threshold, and
an accumulated value corresponding to an adjacent ordinate below the second ordinate is smaller than the second threshold.

8. A device, comprising:
a processor; and
a memory for storing instructions executable by the processor;
wherein the processor is configured to:
binarize a text area including a row of characters;
calculate a histogram in a vertical direction of the binarized text area, wherein the histogram includes abscissas of pixels in each column and corresponding accumulated values of foreground color pixels of the pixels in each column; and
identify a character area of each of one or more characters in the text area according to distribution information of the accumulated values,
wherein in identifying the character area of each of the one or more characters, the processor is further configured to:
determine a plurality of sets of abscissas according to the distribution information of the accumulated values in the histogram, each of the plurality of sets of abscissas including a first abscissa and a second abscissa to the right of the first abscissa, wherein:
accumulated values respectively corresponding to the first abscissa and an adjacent abscissa on the right of the first abscissa are larger than a first threshold,
an accumulated value corresponding to an adjacent abscissa on the left of the first abscissa is smaller than a second threshold,
accumulated values respectively corresponding to the second abscissa and an adjacent abscissa on the left of the second abscissa are larger than the first threshold, and
an accumulated value corresponding to an adjacent abscissa on the right of and the second abscissa is smaller than the second threshold; and
for each of the plurality of sets of abscissas, identify a pixel column where the first abscissa locates as a left edge of a character area, and identify a pixel column where the second abscissa locates as a right edge of the character area.

9. The device of claim 8, wherein the processor is further configured to:

identify a third abscissa in the histogram according to the distribution information of the accumulated values, wherein the third abscissa corresponds to a left edge of a character area of a first valid character among the row of characters, or corresponds to a right edge of a character area of a last valid character among the row of characters; and search for and obtain, from the third abscissa in a predetermined direction and based on the distribution information of the accumulated values, the plurality of sets of abscissas.

10. The device of claim 9, wherein:

the third abscissa corresponds to the left edge of the character area of the first valid character among the row of characters; and the processor is further configured to:

search for and obtain, from a first abscissa of an $i^{th}$ set of abscissas in the histogram and towards right, a fourth abscissa, wherein:

accumulated values respectively corresponding to the fourth abscissa and an adjacent abscissa to the left of the fourth abscissa are larger than the first threshold, an accumulated value corresponding to an adjacent abscissa to the right of the fourth abscissa is smaller than the second threshold, i is larger than or equal to 1, and smaller than or equal to n, i is a positive integer of which an initial value is 1, n is a number of valid characters in the row of character, and the first abscissa of the $i^{th}$ set of abscissas is the third abscissa;

determine the fourth abscissa to be a second abscissa of the $i^{th}$ set of abscissas;

search for and obtain, from the fourth abscissa in the histogram and towards right, a fifth abscissa, if i is less than n, wherein:

accumulated values respectively corresponding to the fifth abscissa and an adjacent abscissa to the right of the fifth abscissa are larger than the first threshold, and an accumulated value corresponding to an adjacent abscissa on the left of the fifth abscissa is smaller than the second threshold; and set i to i+1, and determine the fifth abscissa to be the first abscissa of the $i^{th}$ set of abscissas.

11. The device of claim 9, wherein:

the third abscissa corresponds to the right edge of the character area of the last valid character among the row of characters; and the processor is further configured to:

search for and obtain, from a second abscissa of a $j^{th}$ set of abscissas in the histogram and towards left, a sixth abscissa, wherein:

accumulated values respectively corresponding to the sixth abscissa and an adjacent abscissa to the right of the sixth abscissa are larger than the first threshold, an accumulated value corresponding to an adjacent abscissa to the left of the sixth abscissa is smaller than the second threshold, j is larger than or equal to 1, and smaller than or equal to n, j is a positive integer of which an initial value is n, n is a number of valid characters in the row of characters, and the second abscissa of the $j^{th}$ set of abscissas is the third abscissa;

determine the sixth abscissa to be the first abscissa of the $j^{th}$ set of abscissas;

search for and obtain, from the sixth abscissa in the histogram and towards left, a seventh abscissa, if j is more than 0, wherein:

accumulated values respectively corresponding to the seventh abscissa and an adjacent abscissa to the left of the seventh abscissa are larger than the first threshold, and an accumulated value corresponding to an adjacent abscissa to the right side of the seventh abscissa is smaller than the second threshold; and set j to j−1, and determine the seventh abscissa to be the second abscissa of the $j^{th}$ set of abscissas.

12. The device of claim 9, wherein:

the third abscissa corresponds to the left edge of the character area of the first valid character among the row of characters; and the processor is further configured to:

when the row of characters include both valid and invalid characters and a first distance between a valid character and an invalid character is larger than a second distance between two adjacent valid characters, search for and obtain, from a predetermined abscissa in the histogram and towards left, an interval having a width is larger than the second distance, and determine, an abscissa located on a right side of the interval and having an accumulated value of foreground color pixels larger than the first threshold, as the third abscissa, wherein:

the predetermined abscissa is among a predetermined range set according to an empirical value, and the accumulated value of the foreground color pixels in the interval is smaller than the second threshold; and when the row of characters are all valid characters, determine a first one of abscissas, located on the left side of the histogram and having an accumulated value of foreground color pixels larger than the first threshold, as the third abscissas.

13. The device of claim 9, wherein:

the third abscissa corresponds to a right edge of the character area of the last valid character among the row of characters; and the processor is further configured to:

when the row of characters include both valid and invalid characters and a first distance between a valid character and an invalid character is larger than a second distance between two adjacent valid characters, search for and obtain, from a predetermined abscissa in the histogram and towards right, an interval having a width larger than the second distance, and determine, an abscissa located on a left side of the interval and having an accumulated value of foreground color pixels larger than the first threshold, as the third abscissa, wherein:

the predetermined abscissa is among a predetermined range set according to an empirical value, and the accumulated value of the foreground color pixels in the interval is smaller than the second threshold; and when the row of characters are all valid characters, determine a first one of abscissas, located on the right side of the histogram and having an accumulated value of foreground color pixels larger than the first threshold, as the third abscissa.

14. The device of claim 8, wherein, before binarizing the text area including the row of characters, the processor is further configured to:
   binarize a target image area;
   calculate, in a horizontal direction, a horizontal histogram for the binarized target image area, wherein the horizontal histogram includes ordinates of pixels in each row and corresponding accumulated values of foreground color pixels of the pixels;
   determine, according to distribution information of the accumulated values in the horizontal histogram, a plurality of sets of ordinates, each of the plurality of sets of ordinates including a first ordinate and a second ordinate below the first ordinate; and
   for each of the plurality of sets of ordinates, identify a pixel row where the first ordinate is located as an upper edge of a corresponding row of characters, and identify a pixel row where the second ordinate is located as a lower edge of the corresponding row of characters, wherein:
      accumulated values respectively corresponding to the first ordinate and an adjacent ordinate below the first ordinate are larger than the first threshold,
      an accumulated value corresponding to an adjacent ordinate above the first ordinate is smaller than the second threshold,
      accumulated values respectively corresponding to the second ordinate and an adjacent ordinate above the second ordinate are larger than the first threshold, and
      an accumulated value corresponding to an adjacent ordinate below the second ordinate is smaller than the second threshold.

15. A non-transitory computer-readable storage medium storing instructions that, when executed by a processor, cause the processor to perform a method for character area identification, the method comprising:
   binarizing a text area including a row of characters;
   calculating a histogram in a vertical direction of the binarized text area, wherein the histogram includes abscissas of pixels in each column and corresponding accumulated values of foreground color pixels of the pixels in each column; and
   identifying a character area of each of one or more characters in the text area according to distribution information of the accumulated values,
   wherein identifying the character area of each of the one or more characters comprises:
      determining a plurality of sets of abscissas according to the distribution information of the accumulated values in the histogram, each of the plurality of sets of abscissas including a first abscissa and a second abscissa to the right of the first abscissa, wherein:
         accumulated values respectively corresponding to the first abscissa and an adjacent abscissa on the right of the first abscissa are larger than a first threshold,
         an accumulated value corresponding to an adjacent abscissa on the left of the first abscissa is smaller than a second threshold,
         accumulated values respectively corresponding to the second abscissa and an adjacent abscissa on the left of the second abscissa are larger than the first threshold, and
         an accumulated value corresponding to an adjacent abscissa on the right of and the second abscissa is smaller than the second threshold; and
      for each of the plurality of sets of abscissas, identifying a pixel column where the first abscissa locates as a left edge of a character area, and identifying a pixel column where the second abscissa locates as a right edge of the character area.

\* \* \* \* \*